(12) United States Patent
Ito et al.

(10) Patent No.: US 7,819,159 B2
(45) Date of Patent: Oct. 26, 2010

(54) SUBSTRATE ASSEMBLY APPARATUS AND SUBSTRATE ASSEMBLY METHOD

(75) Inventors: Masaaki Ito, Tsuchiura (JP); Yukinori Nakayama, Toride (JP); Tatsuharu Yamamoto, Ryugasaki (JP); Hiroaki Imai, Ryugasaki (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 1189 days.

(21) Appl. No.: 11/439,953

(22) Filed: May 25, 2006

(65) Prior Publication Data

US 2007/0052914 A1    Mar. 8, 2007

(30) Foreign Application Priority Data

May 25, 2005   (JP) .............................. 2005-151762

(51) Int. Cl.
*B29C 65/00*     (2006.01)
*B32B 37/00*     (2006.01)
(52) U.S. Cl. ........................... 156/382; 156/580
(58) Field of Classification Search ................. 156/381, 156/382, 580, 285, 286
See application file for complete search history.

(56) References Cited

U.S. PATENT DOCUMENTS

| | | | | |
|---|---|---|---|---|
| 2,724,424 A | * | 11/1955 | Clayton et al. ................ 269/25 |
| 5,407,519 A | * | 4/1995 | Joffe et al. ................... 156/358 |
| 6,256,187 B1 | * | 7/2001 | Matsunaga et al. .......... 361/234 |
| 2004/0095548 A1 | * | 5/2004 | Lim et al. .................... 349/187 |

FOREIGN PATENT DOCUMENTS

| JP | 10-026763 | 1/1998 |
|---|---|---|
| JP | 2001-005401 | 1/2001 |
| JP | 2001-305563 | 10/2001 |
| JP | 2004-233473 | 8/2004 |

OTHER PUBLICATIONS

Machine translation for JP 2004-233473 Aug. 2009.*

* cited by examiner

*Primary Examiner*—John L Goff
(74) *Attorney, Agent, or Firm*—Antonelli, Terry, Stout & Kraus, LLP.

(57) ABSTRACT

A bonding apparatus, suitable for accurately bonding large substrates for a liquid crystal display, includes Z-axis drive mechanisms, and upper and lower chambers. The Z-axis drive mechanisms for moving an upper frame vertically are disposed at four corners of a mount. The upper chamber is supported by the upper frame and has an upper table inside. The lower chamber has a lower table inside and is supported on the mount. The upper and lower chambers are united through a seal ring to define a vacuum chamber. Moving the upper frame moves the upper chamber vertically to open or close the vacuum chamber. The lower table is supported via a free joint stage between the plurality of support legs and the table, and is moved horizontally by a side thrust mechanism disposed outside of the vacuum chamber.

2 Claims, 4 Drawing Sheets

SUBSTRATE ASSEMBLY APPARATUS AND SUBSTRATE ASSEMBLY METHOD

BACKGROUND OF THE INVENTION

The present invention relates to a substrate assembly apparatus that, when forming a liquid crystal display, drops liquid crystal to a substrate on a table and then bonds substrates together using an adhesive applied to either one of substrates placed on a pressure board side or on the table.

An apparatus disclosed in Japanese Patent Laid-open No. Hei 10-26763 is known as an apparatus for manufacturing a liquid crystal display panel. Disclosed in this publication is a procedure that flows as follows. Specifically, a first of two glass substrates having transparent electrodes and thin film transistor arrays disposed thereon is coated with liquid crystal and spacers are disposed dispersedly. A second of the two glass substrates is then placed on the first glass substrate using a pin having a vertical motion mechanism. The second glass substrate is positioned correctly using positioning pins disposed in a crosswise direction of the apparatus. A chamber is then vacuumized and the two glass substrates are overlapped with each other and positioned correctly again. The pressure inside the chamber is then returned to the atmospheric side pressure to complete the bonding process.

Japanese Patent Laid-open No. 2001-305563 discloses an arrangement having an integrated vacuum chamber that includes therein a first table and a second table. A first of two substrates is removably fixed to an upper surface or a lower surface of the first table. A second of the two substrates is removably fixed to a lower surface or an upper surface of the second table. The first and the second tables are disposed such that the upper and lower surfaces, to which the respective substrates are fixed, oppose each other. One of the two tables is coupled to the vacuum chamber via an elastic body airtightly and movably. The table includes drive means that move at least in a horizontal direction relative to the vacuum chamber toward an atmospheric side of the vacuum chamber partitioned by the elastic body.

Japanese Patent Laid-open No. 2001-5401 discloses a substrate assembly apparatus having two chambers, an upper and a lower chamber. The lower chamber includes a substrate transport unit and a liquid crystal dispensing unit.

Further, Japanese Patent Laid-open No. 2004-233473 discloses an arrangement including a lower frame and an upper frame mounted on a mount. The lower frame includes a first Z-axis drive mechanism that largely moves the upper frame vertically. The lower frame includes a lower chamber disposed thereinside. The upper frame includes an upper chamber disposed thereinside. The upper chamber includes an upper table disposed thereinside. The lower chamber includes a second Z-axis drive mechanism disposed on a lower side thereof. The second Z-axis drive mechanism moves a lower table disposed inside the lower chamber vertically over a micro-distance. The lower chamber further includes a drive mechanism disposed on a side surface thereof. The drive mechanism moves the lower table horizontally. The upper frame and the lower frame are then united together. This causes the upper chamber and the lower chamber to be united together via a seal ring and thus a vacuum chamber to be formed.

In the aforementioned Japanese Patent Laid-open No. Hei 10-26763, the substrates are pressurized only by using a differential pressure between a pressure between the substrates and a pressure on the outside of the substrates. This makes it necessary to make sure that a sealant between the substrates reliably and positively fills the space between the two substrates. This requires a greater amount of sealant and there is also a likelihood that the sealant will spread over to a display side. In addition, while the lower substrate is held in position in a vacuum by being placed on a flat stage, the upper substrate is supported at appropriate positions along a circumference thereof by pin-like members. As a result, a large-sized substrate measuring 2 m×2 m or more flexes, which makes it difficult to position accurately the upper and lower substrates.

Furthermore, the upper and lower substrates are directly transported into the vacuum chamber and the vacuum chamber is then exhausted and vacuumized from the atmospheric pressure. However, this exhaustion takes a long time, posing a problem of the arrangement's inability to enhance productivity.

With the trend in the substrate becoming bigger as represented in the arrangement disclosed-in Japanese Patent Laid-open No. 2001-305563, the vacuum chamber itself becomes bigger. In a conventional system using a gate valve for loading and unloading of substrates, in particular, the vacuum chamber itself is made even bigger. This makes it difficult to load and unload substrates and perform maintenance jobs. To fix a substrate to the upper table (pressure plate) and fix and position another substrate to the lower table, the lower chamber may be moved as disclosed in Japanese Patent Laid-open No. 2001-5401. The lower chamber in this case weighs excessively heavily, thus requiring an inordinate driving force. This poses another problem.

The arrangement of a bonding apparatus as disclosed in Japanese Patent Laid-open No. 2004-233473, on the other hand, requires driving mechanisms, one for moving the upper frame vertically and one for moving the upper table or lower table vertically. This makes the apparatus bigger in size and heavier in weight.

The apparatus disclosed in Japanese Patent Laid-open No. 2004-233473 uses a ball spline in a guide mechanism for moving the upper frame vertically. It is therefore likely that a kind of rigidity required in a large-size apparatus cannot be achieved.

Furthermore, the upper and lower tables for holding substrates in large-sized bonding apparatuses must have a flat surface of high accuracy so that uneven pressure during bonding may not occur. It is nonetheless difficult to achieve such flatness of the surfaces in large-sized bonding apparatuses.

OBJECT AND SUMMARY OF THE INVENTION

It is therefore an object of the present invention to solve the above-mentioned problems to provide a compact substrate assembly apparatus capable of assembling substrates to close tolerances.

According to an aspect of the present invention, a substrate assembly apparatus includes Z-axis drive mechanisms, an upper chamber, and a lower chamber. The Z-axis drive mechanisms for moving an upper frame vertically are disposed at four corners of a mount. The upper chamber is suspended from the upper frame and has an upper table inside. The lower chamber has a lower table inside. The lower table is supported on the mount via a plurality of support legs. The upper chamber and the lower chamber are united together through a seal ring to define a vacuum chamber. The upper table is coupled to the upper frame and moved vertically by the Z-axis drive mechanisms via the upper frame. The lower table can be moved horizontally by free joint stages disposed between the plurality of support legs and the table, and a side thrust mechanism disposed on the outside of the vacuum chamber.

According to the present invention, the upper frame and associated elements on the upper side are moved vertically by the drive system disposed on the side of the mount. This arrangement helps make the construction of the apparatus simple, allowing a more compact and lighter bonding apparatus than the apparatuses of the conventional arrangements to be provided. Further, use of a combined guide in a guide mechanism for the upper frame achieves a guide mechanism offering high rigidity. This allows the upper frame and the upper table coupled to the upper frame to be accurately moved vertically.

BRIEF DESCRIPTION OF THE DRAWINGS

Other objects and advantages of the invention will become apparent from the following description of embodiments with reference to the accompanying drawings in which.

DESCRIPTION OF THE EMBODIMENTS

A substrate assembly apparatus according to a preferred embodiment of the present invention will be described below with reference to the accompanying drawings.

Figure 1:
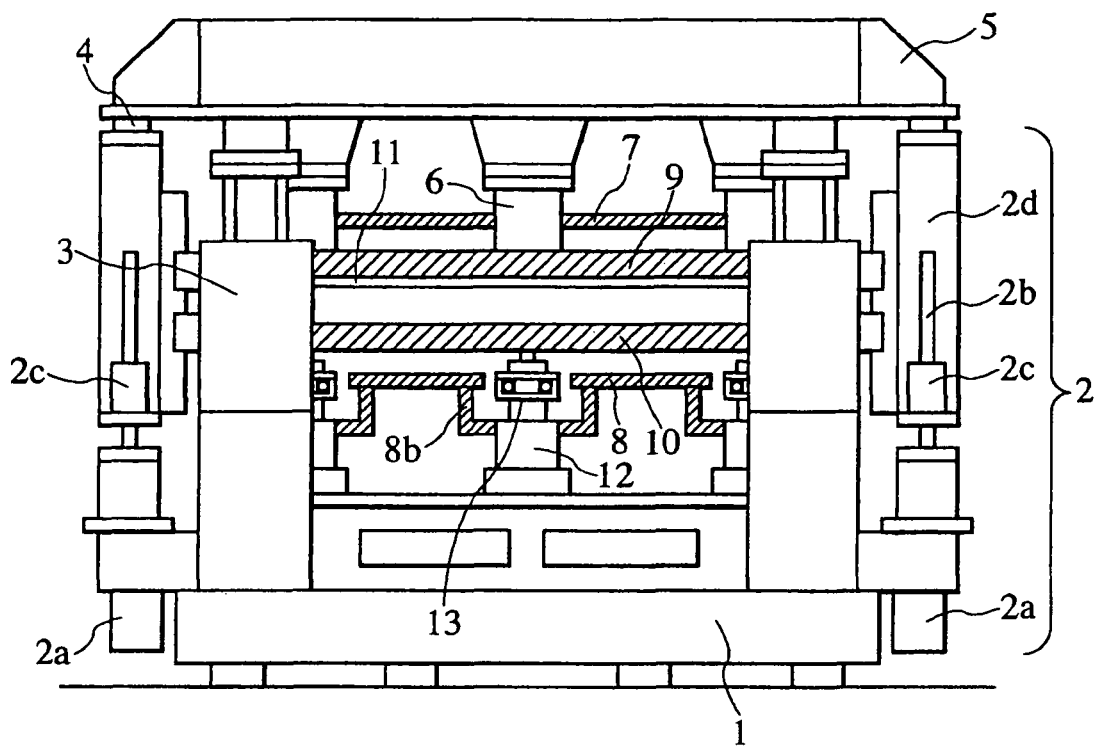
FIG. 1 is a view showing schematically a general construction of a substrate assembly apparatus according to an embodiment of the present invention.

FIG. 1 is a view showing a substrate assembly apparatus according to a preferred embodiment of the present invention. The substrate assembly apparatus according to the preferred embodiment of the present invention includes a lower chamber section and an upper chamber section. The upper chamber section includes an upper frame 5, an upper chamber 7, an upper table 9, and a support beam 2d. The lower chamber section includes a mount 1, a lower chamber 8, a lower table 10, a lower shaft 12, and a Z-axis drive mechanism 2.

Figure 2:
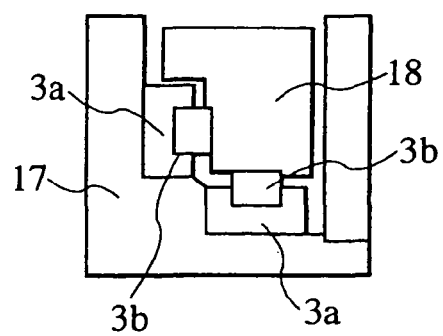
FIG. 2 is a view illustrating a combined guide of a bonding apparatus.

The upper chamber section weighs 10 tf or more, defying easy vertical movement. Accordingly, the mount 1 and the upper frame 5 are formed as a rigid body support member so that the upper frame 5 can be moved vertically by the Z-axis drive mechanism 2 disposed on the mount 1. The upper chamber 7 and the lower chamber 8 are disposed between the mount 1 and the upper frame 5. Specifically, the upper frame 5 and other parts constituting the upper chamber section are arranged so as to be moved vertically relative to the mount 1 via a ball screw receiver 2c disposed on the support beam 2d for supporting the upper frame 5 when a ball screw 2b is rotatably driven. The ball screw 2b is mounted on a rotational shaft of a Z-axis drive motor 2a included in the Z-axis drive mechanism 2 fixed to the mount 1. In addition, the substrate assembly apparatus includes four sets of guide mechanisms 3 disposed on the inside of the Z-axis drive mechanism 2. The guide mechanisms 3 function as a guide for vertical movements of the upper frame 5. FIG. 2 is a partly cross-sectional view showing each of the guide mechanisms 3. Referring to FIG. 2, two linear guides 3a are disposed on a beam 15 fixed to the side of the mount 1 and two linear movement portion 3b are disposed on a beam 16 fixed to the side of the upper frame 5. This arrangement allows the upper frame 5 to be guided for smooth vertical movement.

There are disposed upward of the mount 1 a plurality of lower shafts 12 for supporting the lower table 10. Each of the lower shafts 12 protrudes into an inside of the lower chamber 8 via a vacuum seal for maintaining airtightness with the inside of the lower chamber 8. A free joint stage 13 is disposed between each of the lower shafts 12 and the lower table 10. Besides, free joint stage 13 supports lower table 10 and receives the pressure that acts on the table 10 from above. The free joint stage (hereinafter may be referred to as an XYθ movement unit) 13, disposed so as to be situated inside the lower chamber 8, is arranged so as to be movable independently in each of the X, Y, and θ direction. It is to be noted herein that the XYθ movement unit 13 may be formed as a mechanism incorporating a ball bearing or the like that is fixed vertically, but freely movable horizontally. A plurality of lower table horizontal drive mechanisms are disposed in a horizontal direction (X, Y directions) of the lower table 10 on the outside of the lower chamber 8, which will be described in detail later. It is arranged that these horizontal drive mechanisms are operated to allow positioning in the X, Y, and θ directions to be performed. The lower table 10 also includes a plurality of support pins not shown. The support pins can protrude above a surface of the table so that a clearance can be defined between the substrate and the table surface. A substrate can thereby be received on the table surface from a robot hand or picked up by the robot hand from the table surface. Further, the lower table 10 includes a plurality of suction pickup holes not shown for holding the substrate. The suction pickup holes are connected to a vacuum source.

A seal ring, not shown, formed from an elastic body is disposed at a connection between the lower chamber 8 and the upper chamber 7. This seal ring unites the upper and lower chambers and prevents air from leaking when the chambers are exhausted.

Figure 7:
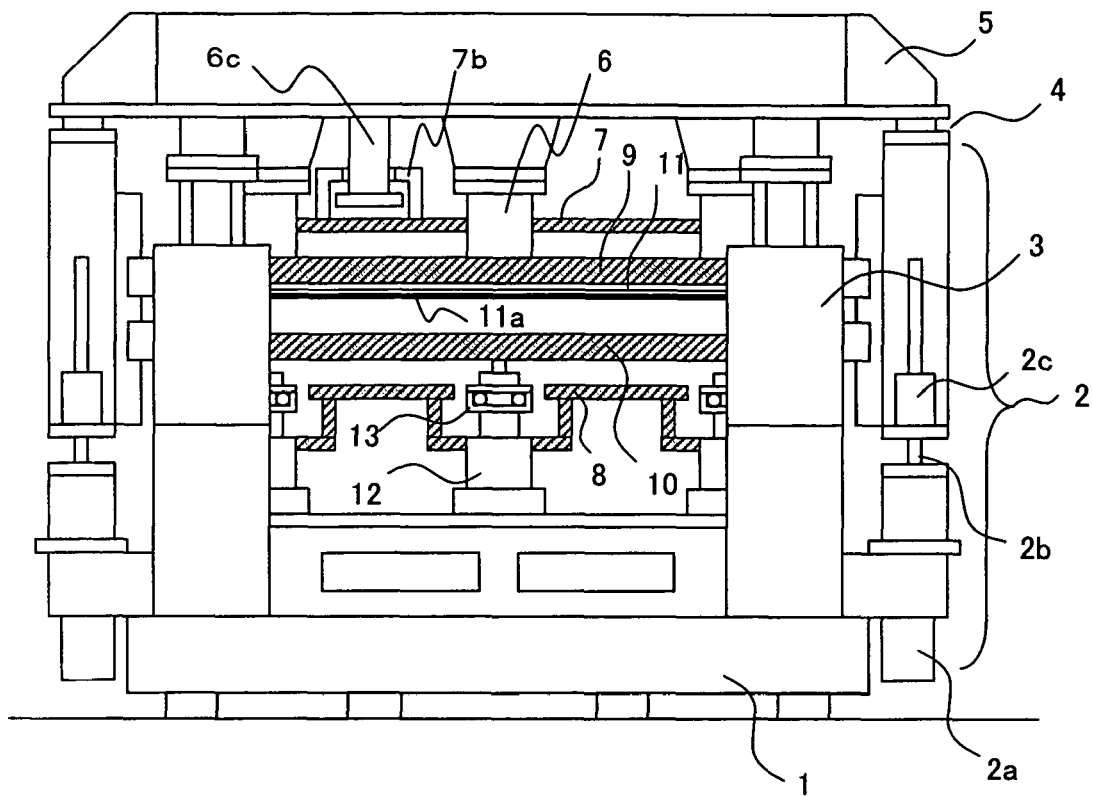
FIG. 7 is a further illustration of the first embodiment of FIG. 1 which includes an illustration of a joint arrangement.

A load cell 4 is disposed at each of connections between the upper frame 5 and the Z-axis drive mechanism 2. The upper chamber 7 is mounted on the inside of the upper frame 5. The upper chamber 7 is suspended from the upper frame 5. The upper chamber 7 can be opened or closed by a vertical movement of the upper frame 5. The upper chamber 7 is coupled to the upper frame 5 through a joint (6c, 7b) shown in FIG. 7. One joint part 6c is fixed to the upper frame 5 and another joint part 7b is fixed to the upper chamber 7. The upper frame 5 further includes a plurality of upper shafts 6 for supporting the upper table 9 disposed in the upper chamber 7. The upper shafts 6 extend into the inside of the upper chamber 7. The upper shafts 6 are connected to the upper chamber 7 via vacuum seals for maintaining airtightness in the chamber. Further, the upper table 9 is fixed to the upper shafts 6 so that the load cells 4 can detect a force exerted when substrates are pressurized. It is further arranged that, when the upper chamber 7 and the lower chamber 8 are united to form a chamber, the joint (6c, 7b) between the upper chamber 7 and the upper frame 5 is disengaged so as to allow only the upper table 9 coupled to the upper frame 5 to be moved vertically. Specifically, it is arranged that the distance over which the upper table 9 moves is greater than the distance over which the upper chamber 7 moves. That is to say, Z-axis drive mechanism 2 operates the upper table 9 vertically.

As described in the foregoing, in accordance with the preferred embodiment of the present invention, the upper table 9 and the lower table 10 are disposed away from the upper chamber 7 and the lower chamber 8, respectively. Accordingly, the chamber is deformed as it is depressurized; however, the deformation is not transmitted to the table, allowing the substrate held on the corresponding table to be held in a horizontal position.

Figure 3:
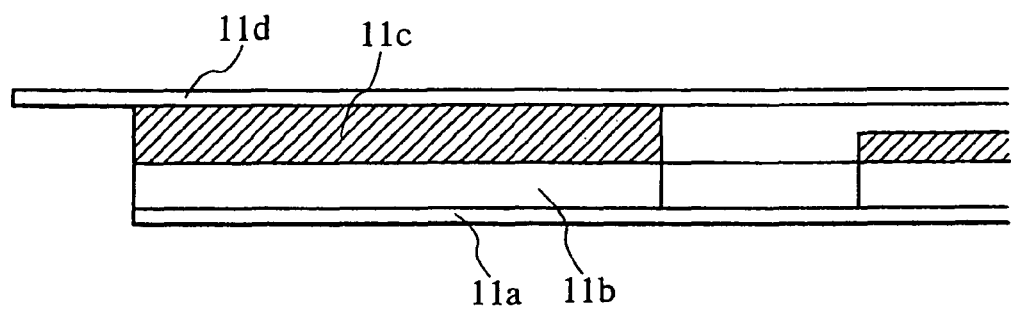
FIG. 3 is a view showing schematically the construction of an electrostatic chuck comprising a sheet-form electrode and an elastic body sheet according to the embodiment of the present invention.

The upper table 9 includes an electrostatic chuck 11 for holding the substrate. FIG. 3 is a partly cross-sectional view showing the construction of the electrostatic chuck. Referring to FIG. 3, the electrostatic chuck 11 includes a sheet-form electrode 11a disposed on a surface of holding the substrate. The electrode 11a includes a flexible plastic sheet, on which an electrode is disposed and which is coated with resist. The electrode 11a is therefore flexible. The electrostatic chuck 11 also includes an elastic buffer layer 11b disposed under the electrode 11a. The elastic buffer layer 11b makes the surface of the electrostatic chuck 11 flexible and deformable. A sub-plate 11c is disposed under the buffer layer 11b. The electrode 11a, the buffer layer 11b, and the sub-plate 11c constitute a single module. Modules are disposed to so as to match the dimensions and shape of the glass substrates to be bonded together and attached to an iron base plate lid. The base plate lid is attracted by a magnet embedded in the upper table 9 and attached to the upper table 9. It is arranged, though not shown, that a bolt is used for securing a support using a fixing bracket for fixing the base plate lid to the upper table 9. To prevent electric discharge, it is preferable that a module, on which no electrodes are formed, be placed at a portion corresponding to an edge of the glass substrate.

Though not shown, the upper table 9 also includes a suction pickup mechanism. After the upper substrate is picked up onto the table surface by the suction pickup mechanism, the electrostatic pickup mechanism is actuated to suppress electric discharge occurring when the substrate is away from the table surface. The suction pickup mechanism further includes a plurality of vertically movable pickup support nozzles (that protrude from the table surface so as to attract the upper substrate reliably).

Figure 4:
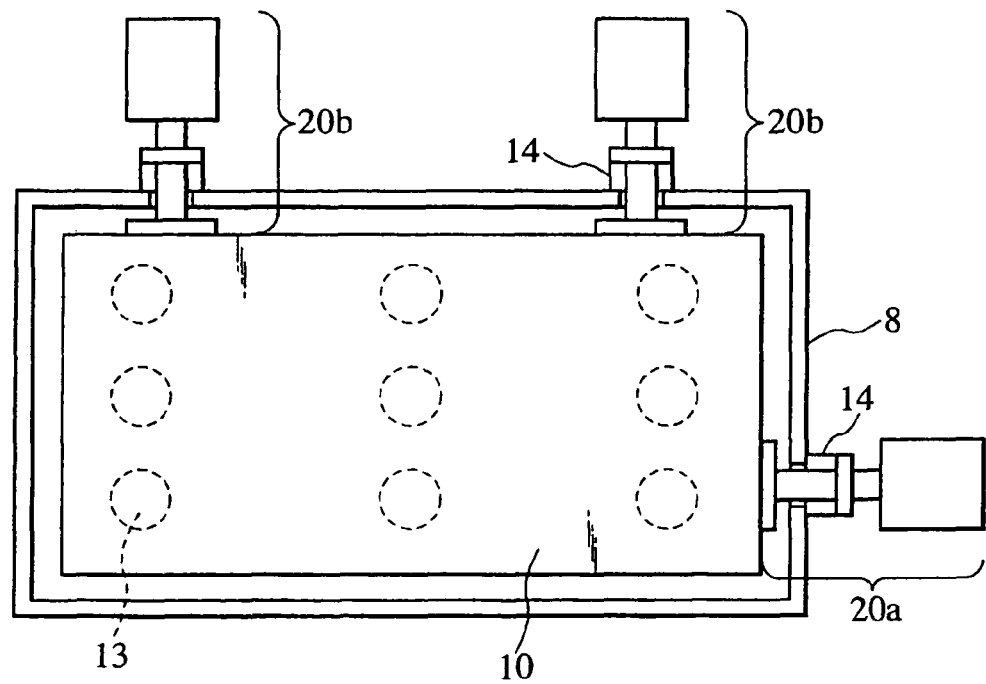
FIG. 4 is a view showing a typical arrangement of a side thrust mechanism of a lower table according to the embodiment of the present invention.

FIG. 4 is a view showing an arrangement of a horizontal movement mechanism of the lower table.

Referring to FIG. 4, in accordance with the preferred embodiment of the present invention, side thrust mechanisms 20 are disposed at least three places (two places 20b in the longitudinal direction and one place 20a in the crosswise direction) on an outer periphery of the lower table 10. Each of the side thrust mechanisms 20 includes a drive mechanism for moving the lower table 10 horizontally. Each of the side thrust mechanism 20a disposed at one place in the crosswise direction and the side thrust mechanisms 20b disposed at two places in the longitudinal direction is offset from a corresponding central axis of the table. This arrangement of the side thrust mechanisms 20 being offset from the central axes of the table causes displacement in the θ direction to act on the table. The arrangement of the side thrust mechanisms 20 is not limited to that adopted in the preferred embodiment of the present invention; rather, the side thrust mechanisms 20 may be disposed at two places on two sides of a rectangle, or at four places on each side of the rectangle.

As shown by a dotted line in FIG. 4, according to the preferred embodiment of the present invention, the apparatus includes a total of nine free joint stages 13 disposed on the lower shafts 12 under the lower table 10. This arrangement allows the lower table 10 to be easily moved in the horizontal direction when the side thrust mechanisms 20 are actuated.

Figure 5:
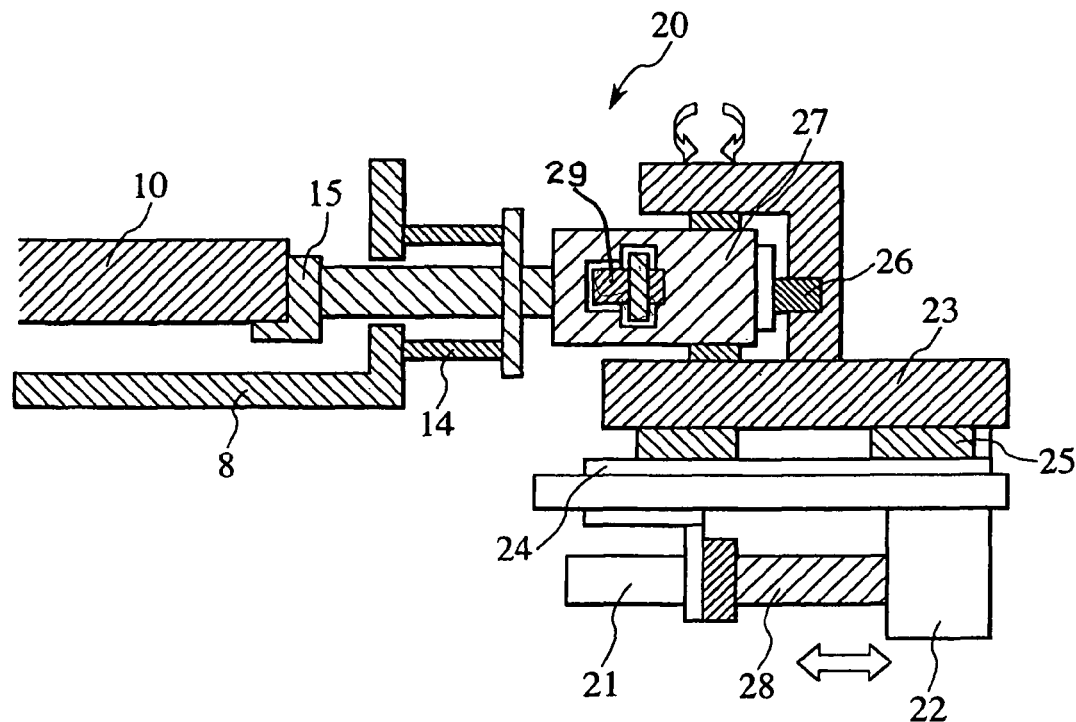
FIG. 5 is a view showing in detail the side thrust mechanism of the lower table.

FIG. 5 is a view showing in detail the side thrust mechanism 20. Referring to FIG. 5, the side thrust mechanism 20 operates as follows. Specifically, an auxiliary member 15 fixed to a side surface of the lower table 10 is moved when a ball screw 28 is rotated using a drive motor 21 disposed on the outside of the lower chamber 8 to move a movable member 22 to the right and left in FIG. 5. The movable member 22 is fixed to a side thrust member 23. A linear movement member 25 disposed on the underside of the side thrust member 23 travels along a linear rail 24 fixed to the side of the mount 1 of the bonding apparatus. The side thrust member 23 has a coupling portion 27, with which the side thrust member 23 can be coupled to the auxiliary member 15. The coupling portion 27 allows the auxiliary member 15 to be moved vertically and horizontally via an elastic member 26, such as a spring or the like. Oblique lined top-like parts 29, inside the area 27 in FIG. 5, act like a damper to some extent, and auxiliary member 15 is able to have fine displacement vertically and horizontally. The lower table 10 is supported by free joint stages 13, so auxiliary member 15 rarely receives the downward load in FIG. 5. But, in case of pressuring downwardly by the upper table 9, it is possible to bring about fine vertical and horizontal displacement of lower table 10 by wobbling of the linear rail and so on, auxiliary member 15 is composed of having displacement vertically and horizontally so as to always push or pull the substrate horizontally, even if such fine displacement occurs. Further, the coupling portion 27 is supported rotatably relative to the side thrust member 23. Besides, because the auxiliary 15 is fixed relative to the lower table 10, horizontal force to push or pull the lower table 10 is generated by the side thrust member 23. In addition, a space between the auxiliary member 15 and the lower chamber 8 is hermetically-sealed by a shield member (bellows) 14 formed from an accordion elastic body so that a vacuum state in the vacuum chamber can be maintained. Though not shown in FIG. 5, the linear rail 24 has a linear scale that can be used to measure the amount of movement of the side thrust member 23. The measured value can be used for correcting deviation in the position between the lower table 10 and the upper table 9.

Figure 6:
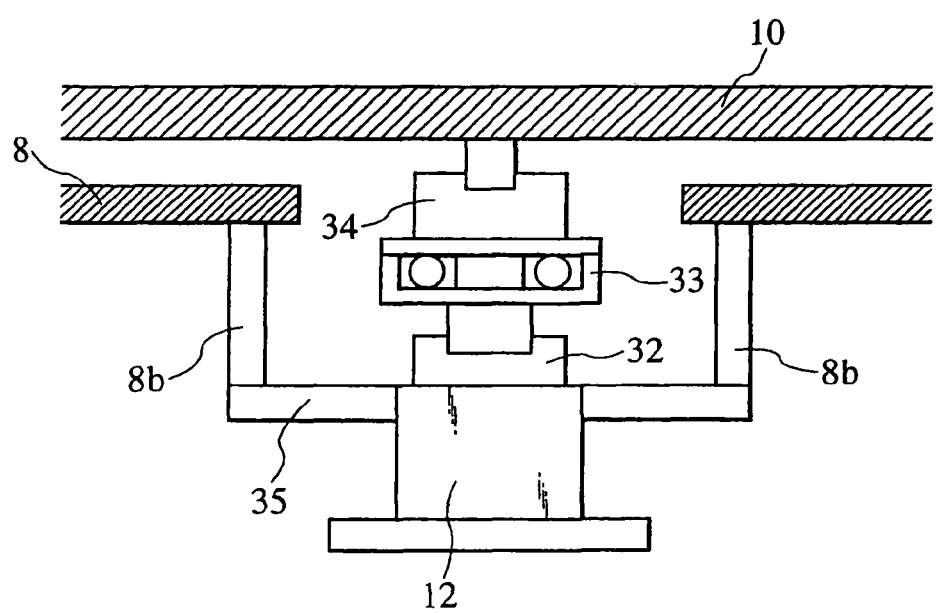
FIG. 6 is a view showing in detail a free joint disposed below the lower table.

FIG. 6 is a view showing the construction of the free joint stage 13. The free joint stage 13 is mounted on the lower shaft 12 fixed on the mount 1. The free joint stage 13 includes an X stage 32, a cross roller 33, and a Y stage 34. The X stage 32 includes a linear rail (linear guide) extending in the X direction on the lower shaft 12 and a movable member mounted thereon. The cross roller 33 mounted on the X stage 32 is rotatable in the θ direction. The Y stage 34 includes a linear rail (linear guide) extending in the Y direction on the cross roller 33 and a movable member attached to the lower table 10. The lower chamber 8 has a through hole made at a portion thereof, at which the free joint stage 13 is disposed. Accordingly, the substrate assembly apparatus includes a shield member (bellows) 8b formed from an accordion elastic body disposed between a receiver base portion 35 extended horizontally from the lower shaft 12 and the lower chamber 8 so that a vacuum can be maintained therein.

Though not shown in FIG. 1, the substrate assembly apparatus further includes a plurality of mark observation cameras disposed on the side of the lower table 10 for observing positioning marks on the lower substrate placed on the lower table 10 and the upper substrate. The lower table 10 includes a plurality of windows provided for camera observation.

Assembly procedures of the liquid crystal substrates using the substrate assembly apparatus according to the embodiment of the present invention will be described below.

The Z-axis drive mechanism 2 is first operated to ascend the upper chamber 7 and the upper table 9 together away from the lower chamber 8 and the lower table 10. This is done to make available a space for loading substrates and holding the substrates between the upper table 9 and the lower table 10. The distance of movement involved (the gap between the upper chamber 7 and the lower chamber 8) is about 100 to 200 mm. It is to be noted that a distance of about 200 to 300 mm between the upper chamber 7 and the lower chamber 8 should help improve workability for maintenance and cleaning jobs performed for the inside of the chamber.

The robot hand is then used to load the upper substrate, with a bonding surface thereof faced toward the lower table 10, onto the lower surface of the upper table 9. The plurality of pickup support nozzles not shown are lowered from the upper table 9, so that leading ends of the pickup support nozzles pick up the upper substrate. The pickup support nozzles are supplied with vacuum, with which the substrate is picked up and held in position. Thereafter, the pickup support nozzles are retracted until the leading ends thereof are flush with the upper table surface. Vacuum is then supplied to the suction pickup holes around the nozzles so that the substrate is held on the upper table surface. A voltage is applied to the electrostatic chuck 11 in this condition to achieve electrostatic pickup of the substrate.

Procedures for holding the lower substrate on the lower table 10 will be described below. If substrates which have been bonded together exist on the lower table 10 after the upper substrate has been picked up and held on to the upper table 9, the support pins included in the lower table 10 are protruded above the lower table surface to lift the substrates off the lower table surface, so that the robot hand can be inserted into a space below the substrates. The substrates are then taken out of the vacuum chamber by the robot hand. An adhesive (sealant) is thereafter applied annularly to a lower substrate surface. The robot hand is then used to load the lower substrate, with liquid crystal dispensed over an area enclosed by the adhesive, to the position of the lower table 10 and place the lower substrate on the support pins. In the foregoing description, the adhesive is applied to the lower substrate. It is nonetheless possible to apply the adhesive to the upper substrate or both the upper and lower substrates.

The support pins are then retracted in the lower table 10 such that leading ends thereof are flush with the surface of the lower table 10. Vacuum is then supplied from a vacuum source to the suction pickup holes included in the lower table 10.

When holding of the upper and lower substrates on the upper and lower tables, respectively, is completed, the Z-axis drive mechanism 2 is operated to perform the following operation. Specifically, the upper frame 5, the upper chamber 7, and the upper table 9 are lowered so that the upper chamber 7 and the lower chamber 8 are united via the seal ring to define the vacuum chamber. At this time, a gap of about several millimeters is maintained between the upper table 9 and the lower table 10 so that the upper substrate does not contact the lower substrate. With the vacuum chamber defined, a positioning camera having a deep focal depth disposed on the side of the lower chamber 8 is then used to observe the positioning marks made on the upper and lower substrates and the amount of deviation is thereby found. If a camera having a shallow focal depth is used, however, a mechanism for moving the camera vertically is employed and the following steps are taken.

Specifically, the positioning mark on the upper substrate is first recognized. Then, the camera is moved downward and the positioning mark on the lower substrate is recognized. The amount of deviation in position between the positioning marks of the upper and lower substrates is thereby determined. The side thrust mechanisms 20 is thereafter driven so that the lower table 10 is moved by the free joint stage 13, thus correcting any deviation in the X, Y, and θ directions of the upper and lower substrates.

When the positioning of the upper and lower substrates is completed, air in the vacuum chamber is evacuated through an exhaust port, not shown, in the side of the lower chamber 8 and depressurized. When the vacuum chamber is depressurized sufficiently to a state suitable for bonding, the Z-axis drive mechanism 2 is then operated to move the upper table 9 toward the lower table 10 by way of the upper frame 5, thereby bonding and pressurizing the upper and lower substrates. When the substrates are pressurized at this time, protrusions of the electrostatic chuck 11 deform. This allows the entire substrates to be uniformly pressurized. The substrates held in position on the corresponding tables can at times be deviated during pressurization. The positioning camera should be used to observe the positioning marks from time to time to thereby correct any deviation in the positions.

As seen from the above, the upper chamber 7 is suspended, and when the upper frame 5 and the upper chamber 7 and so on are moved downwardly, the upper frame 5 and the upper chamber 7 move together until they are united. After being united, to form a depressurized chamber the upper frame 5 and the upper chamber 7 are released from each other, such that only the upper frame 5 can be moved downwardly. The upper table 9 is fixed relative to the upper frame 5, so the upper table 9 can be moved downwardly inside the depressurized chamber.

This time, the upper frame 5 and the upper table 9 can be moved vertically as to be supported from below by the Z-axis drive mechanism disposed with the mount 1. A flat level of the upper table 9 etc. is accurately maintained because the upper frame 5 is supported at four corners. Furthermore, bonding accuracy is achieved because it is possible to press the substrates equally from above by the upper table 9.

Instead of this structure, if one takes the structure after the depressurized chamber is formed, and only the upper table 9 is moved downwardly to generate the downward pressure (as in the done in some of the aforementioned prior art,) many parts are required for the upper frame, and Z-axis drive mechanism that will become large, thereby causing the apparatus itself to become large.

In the case that pressure acts on the substrates from above, as is done in some of the aforementioned prior art, it is not suitable to downsize the apparatus because it needs to have drive mechanisms to generate a large force against gravity, and it needs many parts in the mount portion. Also, it is needed not to move the upper table because of the upward pressure from below.

Further, in the case of some of the aforementioned prior art, variations in individual pressures to the substrates from upward or downward directions are more likely to occur than the pressure of the present embodiment. Therefore, it is possible with the present invention to minimize variations of quality between the products.

This time, if one dispose a Z-axis drive mechanism on only one corner or two corner of one side, as is the case in some of the aforementioned prior art, there is no inclination of the upper table in the figure, because the figure shows ideal state. But there is some inclination of the upper table in reality, even if it is a few microns. Due to this, it is difficult to achieve the desired parallel level of the substrates, and it is difficult to satisfy the desired quality of the bonded panel. If there is variation of pressure inside one panel and the parallel level does not satisfy the desired level, and worse, when the panel exposes the air pressure, the panel will possibly be broken from the minimum pressured portion of the adhesive (sealant) and liquid crystal flows out from the break point of the sealant. Generally, this prior art structure makes the apparatus higher rigid and prevents effective downsizing. On the other hand, in the present embodiment, there are four Z-axis drive mechanisms on each corner of the apparatus so that a highly parallel level can be achieved. And, accordingly, it is suitable to downsize the apparatus also.

When the bonding of the upper and lower substrates through pressurization is completed, a UV irradiation mechanism not shown is operated in this condition to harden the adhesive at several locations and thereby secure the two substrates together temporarily. Atmospheric air is thereafter introduced into the vacuum chamber so that the atmospheric pressure is resumed inside the vacuum chamber. This allows an even greater thrust force to act on the substrates, pressurizing the substrates to a predetermined thickness. In this condition, the entire adhesive is hardened by the UV irradiation mechanism and the bonding of the liquid crystal substrates is completed.

When the bonding of one pair of substrates is completed, preparations are made for bonding of the next pair of substrates and unloading of the completed liquid crystal substrates is performed as described earlier.

As described in the foregoing, the substrate assembly apparatus as arranged according to the preferred embodiment of the present invention simplifies the drive mechanism and contributes to building of a compact and lightweight apparatus.

The vertical movement guide mechanism formed from a highly rigid structure can help minimize deviation in the X, Y, and θ directions relative to an extraneous force applied during vertical movement.

The above-referenced upper table is arranged to use both the suction pickup mechanism and the electrostatic pickup mechanism using vacuum. It is nonetheless appropriate to add further an adhesive holding mechanism using adhesion. It is still further appropriate to combine such an adhesive holding mechanism with either the suction pickup mechanism or the electrostatic pickup mechanism. Similarly, in accordance with the preferred embodiment of the present invention, the above-reference lower table incorporates only the suction pickup mechanism. It is, however, possible to combine the adhesive holding mechanism with the electrostatic pickup mechanism. This arrangement makes smaller the suction pickup force in the vacuum state, thus reliably preventing the substrates from being moved by disturbance or the like.

In accordance with the preferred embodiment of the present invention as described heretofore, the joint between the upper frame and the upper chamber is disengaged when the vacuum chamber is formed by uniting the upper and lower chambers. If the distance over which the upper table is moved to bond the substrates together can be taken up by the amount of deformation of the seal ring, however, the joint between the upper chamber and the upper frame may be eliminated so that the upper chamber and the upper table are moved integrally to accomplish the bonding operation.

What is claimed is:

1. A substrate assembly apparatus to bond a lower substrate and an upper substrate together, the lower substrate including a panel forming section, onto which a liquid crystal is dropped, both substrates being vertically and opposingly held in position, positioned relative to each other and brought together to allow a gap therebetween, and bonded together within a depressurized chamber, the apparatus comprising:
    an upper frame;
    an upper chamber forming part of the chamber divided vertically into two, the upper chamber being supported by the upper frame and including thereinside an upper table to hold the upper substrate;
    a lower chamber disposed on a mount, the lower chamber having a lower table to hold the lower substrate; and
    drive means for moving the upper frame vertically, disposed at four corners of the mount,
    wherein the upper chamber is coupled to the upper frame through a joint;
    wherein the upper frame includes an upper shaft for supporting the upper table disposed in the upper chamber; and
    when the upper chamber and the lower chamber are united to form a chamber, the joint between the upper chamber and the upper frame is disengaged so as to allow only the upper table coupled to the upper frame to be moved vertically.

2. A substrate assembly apparatus to bond a lower substrate and an upper substrate together, the lower substrate including a panel forming section, onto which a liquid crystal is dropped, both substrates being vertically and opposingly held in position, positioned relative to each other and brought together to allow a gap therebetween, and bonded together within a depressurized chamber, the apparatus comprising:
    an upper frame;
    an upper chamber forming part of the chamber divided vertically into two, the upper chamber being supported by the upper frame and including thereinside an upper table to hold the upper substrate;
    a lower chamber disposed on a mount, the lower chamber having a lower table to hold the lower substrate; and
    drive means for moving the upper frame vertically, disposed at four corners of the mount,
    wherein the upper chamber is coupled to the upper frame through a joint;
    wherein the upper frame includes an upper shaft for supporting the upper table disposed in the upper chamber; and
    means for maintaining flatness of the upper table during movement vertically of the upper table to improve bonding of the upper and lower substrates, said means including, when the upper chamber and lower chamber are united to form a chamber, the joint between the upper chamber and the upper frame is disengaged so as to allow only the upper table coupled to the upper frame to move vertically to bond the upper and lower substrates together, wherein the flatness of the upper table is maintained by fixing of the upper table to the upper frame via the upper shaft so that the upper table is held flat by virtue of the provision of the drive means for the upper frame at four corners of the mount.

* * * * *